(12) United States Patent
Tyagi

(10) Patent No.: US 9,384,384 B1
(45) Date of Patent: Jul. 5, 2016

(54) ADJUSTING FACES DISPLAYED IN IMAGES

(71) Applicant: Amazon Technologies, Inc., Reno, NV (US)

(72) Inventor: Ambrish Tyagi, Palo Alto, CA (US)

(73) Assignee: Amazon Technologies, Inc., Reno, NV (US)

( * ) Notice: Subject to any disclaimer, the term of this patent is extended or adjusted under 35 U.S.C. 154(b) by 51 days.

(21) Appl. No.: 14/034,379

(22) Filed: Sep. 23, 2013

(51) Int. Cl.
*G06K 9/36* (2006.01)
*G06K 9/00* (2006.01)

(52) U.S. Cl.
CPC .................................. *G06K 9/00275* (2013.01)

(58) Field of Classification Search
None
See application file for complete search history.

(56) References Cited

U.S. PATENT DOCUMENTS

| | | | | |
|---|---|---|---|---|
| 6,028,960 | A * | 2/2000 | Graf | G06K 9/00268 382/100 |
| 8,488,023 | B2 * | 7/2013 | Bacivarov et al. | 348/239 |
| 8,891,819 | B2 * | 11/2014 | Kaneda | A61B 3/113 345/158 |
| 2005/0276481 | A1 * | 12/2005 | Enomoto | G06K 9/00597 382/190 |
| 2008/0205712 | A1 * | 8/2008 | Ionita et al. | 382/118 |
| 2010/0026831 | A1 * | 2/2010 | Ciuc | G06K 9/00221 348/222.1 |
| 2010/0205667 | A1 * | 8/2010 | Anderson et al. | 726/19 |
| 2011/0229049 | A1 * | 9/2011 | Kondo | 382/233 |
| 2013/0141605 | A1 * | 6/2013 | Kim | G06T 11/60 348/222.1 |
| 2013/0148860 | A1 * | 6/2013 | Musatenko | G06K 9/6206 382/107 |
| 2013/0163814 | A1 * | 6/2013 | Takiguchi | 382/103 |
| 2013/0208167 | A1 * | 8/2013 | Chou | H04N 5/23219 348/333.11 |
| 2015/0278997 | A1 * | 10/2015 | Kim | G06K 9/00281 382/195 |

OTHER PUBLICATIONS

Arandjelovic, Ognjen et al., "Face Recognition with Image Sets Using Manifold Density Divergence", 2005.
Chang, Ya et al., "Manifold of Facial Expression", Computer Science Department, University of California, Santa Barbara, CA 93106, {yachang, cbhu, mturk}@cs.ucsb.edu, 2004.
Glasner, Daniel et al., "Super-Resolution from a Single Image", Jul. 14, 2009.
Kumar, Sanjiv et al., "Hopping on a Face Manifold via People Hopper", Posted Mar. 3, 2010 by Research @ Google.
Lui, Yui M. et al., "Grassmann Registration Manifolds for Face Recognition", European Conference on Computer Vision, Marseille, France, 2008.
Wang, Ruiping et al., "Manifold-Manifold Distance with Application to Face Recognition based on Image Set", IEEE, 2008.
Zhang, Junping et al., "Nearest Manifold Approach for Face Recognition", 6th IEEE International Conference on Automatic Face and Gesture Recognition, 2004.

\* cited by examiner

*Primary Examiner* — Randolph I Chu
(74) *Attorney, Agent, or Firm* — Polsinelli LLP

(57) ABSTRACT

A computing device can acquire a set of images, each image including at least a portion of a user's face. The images can be acquired using one or more cameras and/or from an image library/database associated with the user. Based on the images including the user's face (or portions thereof), a virtual representation for the user's face can be generated. The device can subsequently receive or identify an image including a facial representation (e.g., face or portion thereof) to be adjusted. The device can analyze the image including the facial representation and determine that the facial representation sufficiently matches the virtual representation. Using the virtual representation, (at least a portion of) the face can be adjusted. For example, one or more variations or details associated with the user's face, which are provided via the virtual representation, can be used to replace, improve, or otherwise modify the face in the image.

20 Claims, 11 Drawing Sheets

ADJUSTING FACES DISPLAYED IN IMAGES

BACKGROUND

Computing devices are becoming more commonplace and are used for a wide variety of purposes. Every day, people use their computing devices to create, view, access, and/or interact with various types of content and information, especially as computing devices and applications are growing in number and in function. In some cases, users can use their computing devices to acquire images, such as by taking pictures and/or recording videos. In one example, a user can take pictures with friends and store the pictures on a computing device. In another example, the user can take pictures and upload the pictures to a database or other service on a network separate from the computing device. Further, in some cases, the user can edit the images. Conventional approaches to editing images typically include techniques such as cropping, removing "red eye" effects, adjusting brightness, and adjusting color. However, in some instances, conventional approaches to editing images can be ineffective, challenging, and/or inconvenient. For example, if the face of a subject in a photograph is blurred or obscured, conventional approaches are generally insufficient for correcting or removing the blurring or obscuring of the face without requiring a relatively large amount of manual image editing. In another example, if a subject forgets to smile or accidentally blinks when an image is taken, conventional approaches generally cannot correct for these issues without requiring a relatively large amount of manual image editing. These and other concerns can decrease the overall user experience associated with using computing devices to access and interact with images.

BRIEF DESCRIPTION OF THE DRAWINGS

Various embodiments in accordance with the present disclosure will be described with reference to the drawings, in which.

DETAILED DESCRIPTION

Figure 1:
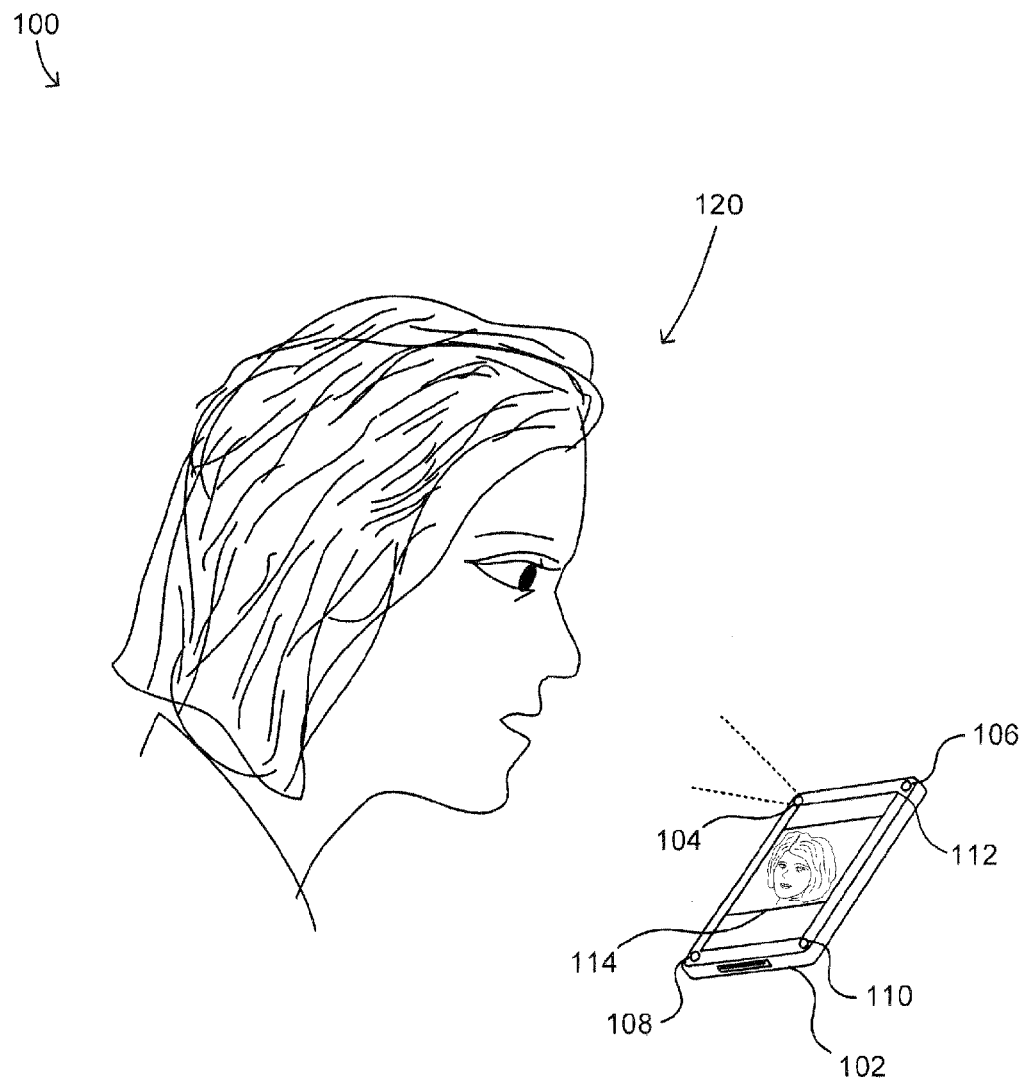
FIG. 1 illustrates an example environment in which aspects of various embodiments can be utilized.

Systems and methods in accordance with various embodiments of the present disclosure overcome one or more of the above-referenced and other deficiencies in conventional approaches to using computing devices to acquire, manipulate, and/or otherwise process images. In particular, various embodiments of the present disclosure can generate a virtual representation of a face of a user and adjust or modify an image including at least a portion of the user's face, such as for the purpose of improving the appearance of the user's face in the image. Various other objects can be recognized and modified as well in various embodiments.

Embodiments in accordance with the present disclosure can acquire a set of images, each image in the set including at least a portion of a user's face. In some embodiments, the set of images can be acquired using one or more cameras of a computing device and/or acquired from an image library or database. Based on the set of images including the user's face (or portions thereof), a virtual representation for the user's face can be generated. In some instances, generating the virtual representation can be based on learning or developing a set of manifolds representative of the user's face. A manifold can be a topological space that near each point resembles Euclidean space. The set of manifolds can include one or more subspaces that correspond to information or details associated with the face, such as variations in lighting conditions, facial expressions, viewing angles, image qualities, etc. Based on the virtual representation (e.g., a model, a set of manifolds, a manifold subspace(s), etc.), various embodiments can adjust or modify the user's face in one or more given images (e.g., received images, identified images, etc.).

In some cases, manifolds can capture image variability associated with a person's face and provide more information about the person's face than a single image of the face can. Manifold learning has become a very active research area in computer vision, pattern recognition, and machine learning. In some cases, the underlying structure of high-dimensional observation face samples whose facial variations are controlled by only a few factors can be modeled by a low-dimensional manifold. In some instances, synthesizing one image to a collection of images can be used to model manifolds. Further, in some embodiments, a number of subspaces can approximate face manifolds.

In one example, a picture can be represented by a set of pixels. In some cases, each pixel has at least one value. For example, a pixel can have three Red-Green-Blue (RGB) values, such as a first value for Red, a second value for Green, and a third value for Blue. In this example, the picture can be represented by the collection of the RGB values for all the pixels. All possible renderings (e.g., appearances) of the picture can be generated by varying the RGB values for the pixels. It follows that all possible renderings of a face included in the picture can be a subset of all of possible renderings. The subset corresponding to the face can be associated with a face manifold.

In some embodiments, the computing device can receive or identify an image including a face, which then can be analyzed to determine whether a portion of the image is to be adjusted (or modified). For example, the device can analyze the image including the face to be adjusted and compare the face against the virtual representation. The device can determine that the face to be adjusted substantially and/or sufficiently matches a virtual representation generated by the device (e.g., the face to be adjusted meets or exceeds a matching level/threshold within an allowable deviation with respect to at least a minimum portion of the virtual representation). The device can determine at least a portion of the face that is to be adjusted. Using the virtual representation, the at least the portion of the face can be adjusted by the device. For example, one or more variations or details provided by the virtual representation can be used to replace, amend, or otherwise improve or alter the at least the portion of the face.

In one example, a given image including a user with her eyes closed can be modified to result in a modified image in which the user's eyes are open. In another example, a given image including a user with her face at least partially blurred and/or occluded can be modified to result in an image with a reduction or elimination of the at least partial blurring and/or occlusion. In a further example, a given image can include a user with an unintended (e.g., sad, angry) facial expression. Various embodiments can modify the image to result in an image with the user having an improved (e.g., happy, positive) facial expression.

Other variations, functions, and advantages are described and suggested below as may be provided in accordance with the various embodiments.

FIG. 1 illustrates an example environment 100 in which aspects of the various embodiments can be utilized. The example environment 100 can comprise an example computing device embodiment 102. The example computing device 102 can be a smartphone, tablet computer, laptop or notebook computer, desktop computer, gaming console, wearable computer (e.g., a watch or glasses), smart television, media player (e.g., smart DVD player), or camera, etc. Various other types of devices can be utilized with the present disclosure as well, and at least some of these devices are discussed in more detail below with reference to FIG. 7 and FIG. 8.

As shown in FIG. 1, the computing device 102 can comprise one or more cameras or image capture components. In some instances, the one or more cameras can include one or more front facing cameras (e.g., 104, 106, 108, 110) and/or one or more rear facing cameras (not shown in FIG. 1). In some embodiments, the computing device 102 can include four front-facing cameras (e.g., 104, 106, 108, 110), each front facing camera being located at substantially one of the four corners of the front face of the device 102, as shown in the example of FIG. 1. The computing device 102 can also comprise a display screen 112. In some cases, the display screen 112 can work in conjunction with a touch sensor. As such, the display screen 112 can correspond to a touch screen. The display screen 112 can be configured to display visible objects, such as an image (e.g., still image, video image frame, etc.).

In some embodiments, at least one of the cameras can capture or acquire image data. For example, a front facing camera (e.g., 104) can capture or acquire one or more images including at least a portion of a user 120 of the device 102. The one or more images can correspond to still image frames, video image frames (e.g., parts of a video), etc. The one or more images 114 can be displayed on the display screen 112, such as in the form of a live video feed. In some cases, the one or more acquired images 114 (e.g., the live video feed) can be utilized as a view finder for the camera (e.g., 104). In some instances, the one or more images 114 (e.g. live video feed) can be utilized in a video conferencing service provided by the computing device 102.

As shown in FIG. 1, the one or more images 114 can include the face of the user 120. Various embodiments of the present disclosure can enable the computing device 102 to obtain information about the face of the user 120 by analyzing the one or more acquired images 114 that include at least a portion of the user's face. For example, various embodiments can initiate a configuration (or initialization) process when the user 120 first acquires (e.g., purchases) and/or starts using the computing device 102. The configuration process can instruct the user 120 to rotate the device 102 and/or move his/her head such that at least one camera (e.g., 104) can acquire images including at least a portion of the user's face from various perspectives/views. Additionally or alternatively, assuming that the user 120 has consented, the device 102 can capture images including the user's face over a determined time period (e.g., within the first few days of use, within the first few months of use, continuously over the lifetime of the device 102, etc.). As such, the acquired images of the user's face can provide information or details about the face under various conditions (e.g., various views/perspectives of the face, various lighting conditions affecting the face, various facial expressions made by the face, etc.). By analyzing the various acquired images that include the user's face (or at least a portion thereof), the device 102 can obtain information about the user's face including details associated with the user's face and/or variations in appearance for the user's face.

Figure 2:
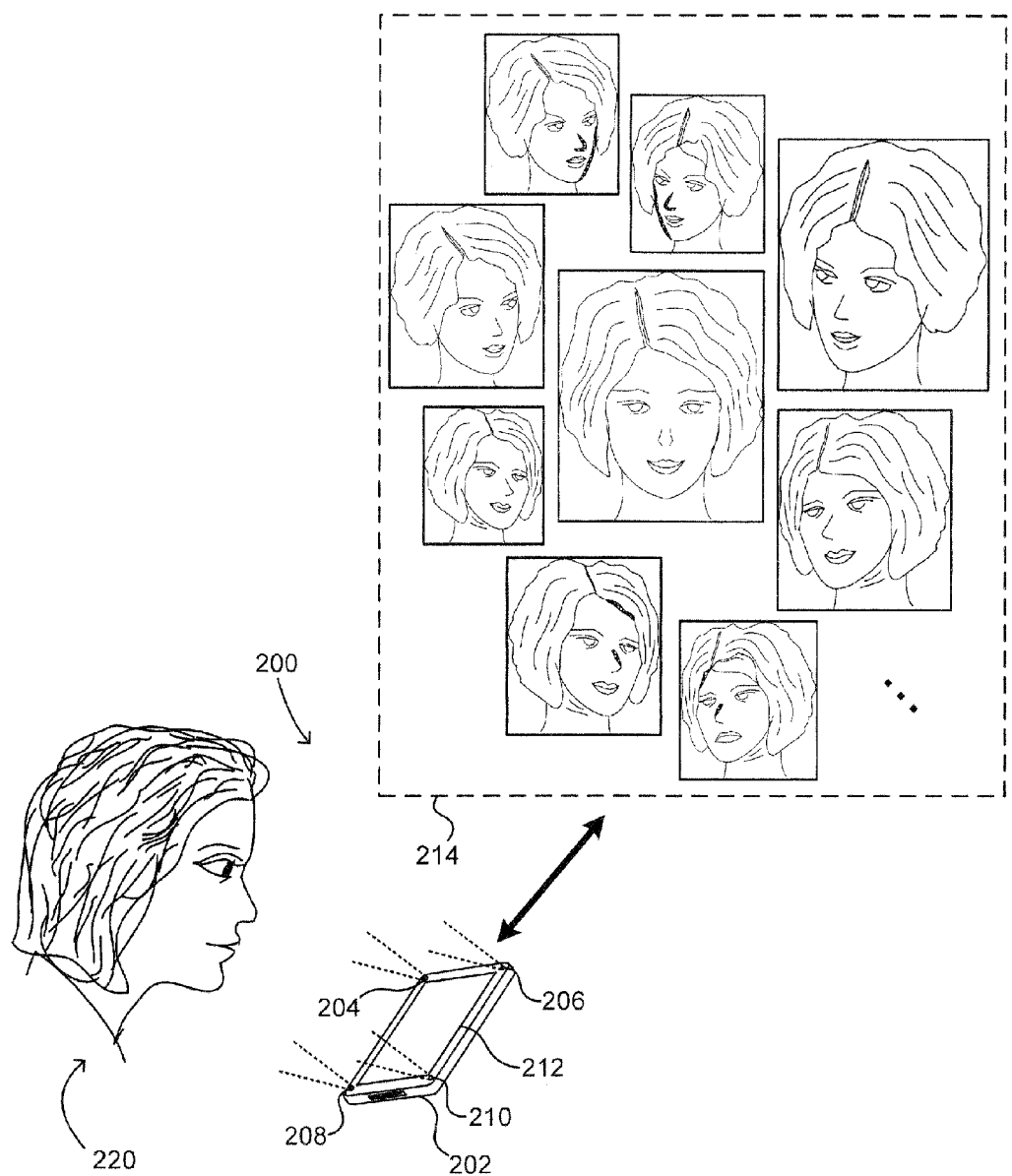
FIG. 2 illustrates an example system embodiment for implementing aspects of various embodiments.

Turning now to FIG. 2, FIG. 2 illustrates an example system embodiment 200 for implementing aspects of various embodiments. The example system 200 can include a computing device 202. As shown in FIG. 2, there can also be a user 220 of the system 200 (or device 202). The computing device 202 can comprise, for example, one or more cameras, such as four front-facing cameras (e.g., 204, 206, 208, 210), as well as a display element 212.

The one or more cameras (e.g., four front-facing cameras 204, 206, 208, 210) can operate to capture or acquire one or more images of the face (or at least a portion thereof) of the user 220. In some cases, the four front-facing cameras (e.g., 204, 206, 208, 210) can capture images of the user's face at substantially the same time. In some cases, the four front-facing cameras (e.g., 204, 206, 208, 210) can capture images of the user's face at different times. As such, the appearance of the user's face under various circumstances can be captured and represented in the images. For example, there can be images of the user's face from different angles or points of view. The images can also be indicative of how the user's face appears under different lighting conditions (e.g., during the day, at night, indoors, outdoors, etc.). The images can also capture different facial expressions made by the user 220. Further, the images can have different properties and/or varying image qualities (e.g., brightness, color, contrast, sharpness, resolution, etc.). It is contemplated that a person having ordinary skill in the art would recognize various other pieces of information about the user's face (or at least a portion thereof) that can be represented, embodied, or otherwise included in the captured/acquired images.

Additionally or alternatively, one or more images of the face of the user 220 can be acquired from an image library (or database) 214 included with the example system 200 in at least some embodiments. In some instances, the image library 214 can reside on a storage element of the computing device 202. In some instances, the image library 214 can reside on a social networking service (e.g., social media service) used by the user 220 and/or on a database on a network (e.g., an online content/file management system) used by the user 220. For example, the user 220 can store images of himself or herself at a social networking service. The user 220 can provide authorization for the device 202 to access the images from the social networking service to obtain information about the user's face. Further, in some cases, metadata about the images (e.g., name tags, location tags, time/date data, descriptions, etc.) can be utilized by the device 202 to refine the information.

Moreover, in some embodiments, images acquired using the one or more cameras of the device can be stored in the image library 214. It follows that images acquired using the cameras and images acquired from the library 214 can be used in conjunction by the device 202 when attempting to obtain information about the user's face.

As shown in the example of FIG. 2, the library 214 can include a plurality of images, each of which includes at least a portion of the user's face. In FIG. 2, some images can show particular perspectives of the face. Some images can show the face under different lighting conditions. Some images can be higher in resolution, while other images can be lower in resolution. Some images can show different facial expressions. A person having ordinary skill in the art would recognize many other variations or details associated with the user's face that can be represented, embodied, or otherwise included in the images, consistent with the scope of the present disclosure.

Further, in some embodiments, the acquired images can incorporate three-dimensional image data. In one example, the multiple cameras (e.g., 204, 206, 208, 210) of the device can acquire images from different angles or perspectives. Stereoscopic differences among the acquired images can be identified and three-dimensional image data can be derived based on the stereoscopic differences. A person of ordinary skill in the art would recognize various approaches that can be utilized with embodiments of the present disclosure in order to acquire three-dimensional image data, such as by utilizing a time of flight (ToF) technique, a structured light scanning technique, a structure from motion technique, and/or a laser scanning technique, etc. Moreover, in some embodiments, three dimensional image data can be acquired via the image library (or database) 214.

Various embodiments of the present disclosure can analyze the acquired images, each of which includes at least a portion of the user's face, to generate a virtual representation of the face of the user 220. In some embodiments, various embodiments can employ image processing techniques (e.g., edge detection, line detection, pixel comparison, facial feature detection, etc.), computer vision techniques, and/or machine learning techniques, etc., to analyze the acquired images in order to generate the virtual representation. In some cases, generating the virtual representation can be based on learning or developing a set of manifolds representative of the face. A manifold can be a topological space that near each point resembles Euclidean space. The set of manifolds can include one or more subspaces that correspond to information or details associated with the face, such as variations in lighting conditions, facial expressions, viewing angles, etc. Based on the virtual representation (e.g., two-dimensional model of the face, three-dimensional model of the face, higher dimensional model of the face, manifolds, manifold subspaces, etc.), various embodiments can adjust or modify the user's face in one or more given images, which will be discussed in more detail with reference to FIG. 3A through FIG. 3D.

Figure 3A:
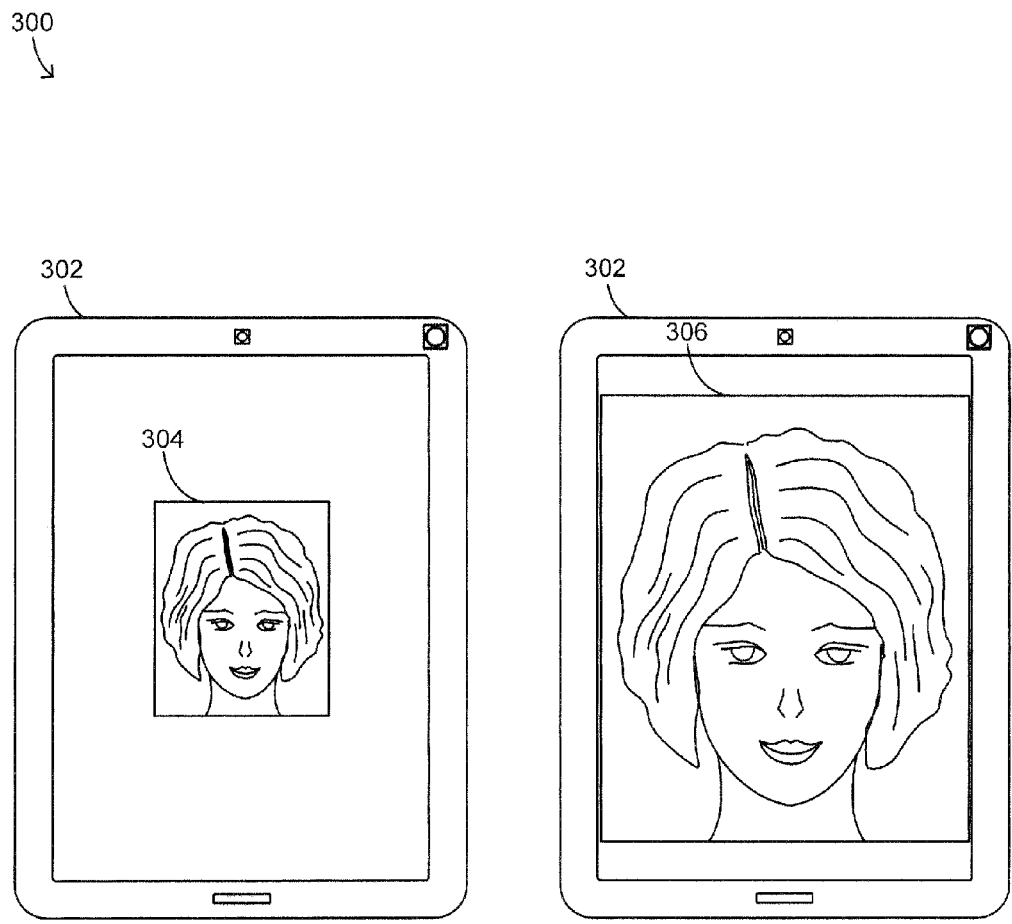
FIG. 3A illustrates an example scenario in which one or more faces displayed in an image can be adjusted.

FIG. 3A illustrates an example scenario 300 in which one or more faces displayed in an image can be adjusted. In the example 300 of FIG. 3A, a computing device 302 can receive, select, or otherwise identify an image (e.g., 304) to be adjusted or modified. The image 304 to be adjusted can include (at least a portion of) a user's face. In this example, the image 304 has a low resolution. The computing device 302 can analyze the image 304 and compare the image 304 to a virtual representation (e.g., a model, a set of manifolds, and/or a manifold subspace(s), etc.) of a "known" or previously identified face. If the face in the image 304 matches (within an allowable deviation and/or at least meets a match level/threshold) the virtual representation (or a minimum portion thereof), then the low resolution of the face in the image 304 can be enhanced (i.e., adjusted, modified). In this example, the virtual representation can provide information about a high resolution image 306 of the face. Accordingly, the low resolution image 304 of the face can be replaced or otherwise improved using the high resolution image 306 of the face.

In some embodiments, to facilitate the comparing process, the device 302 can downscale the high resolution image 306 of the face, which the device 302 has already acquired, to result in a corresponding low resolution image. In some instances, the downscaled/low resolution image (as well as the high resolution image 306) can be stored in the image library. The downscaled/low resolution image can be linked to the high resolution image 306 (i.e., the device and/or image library can have information indicating that the downscaled/low resolution image corresponds to a downscaled copy of the high resolution image 306). The downscaled/corresponding low resolution image can be incorporated into the virtual representation (e.g., a model, a set of manifolds, and/or a manifold subspace(s), etc.) of the face. Thus, when the low resolution image 304 is received or selected, the low resolution image 304 can be found to match the low resolution image downscaled from and corresponding to the high resolution image 306. As such, the device 302 can determine that the low resolution image 304 should be adjusted or modified based on the high resolution image 306.

Figure 3B:
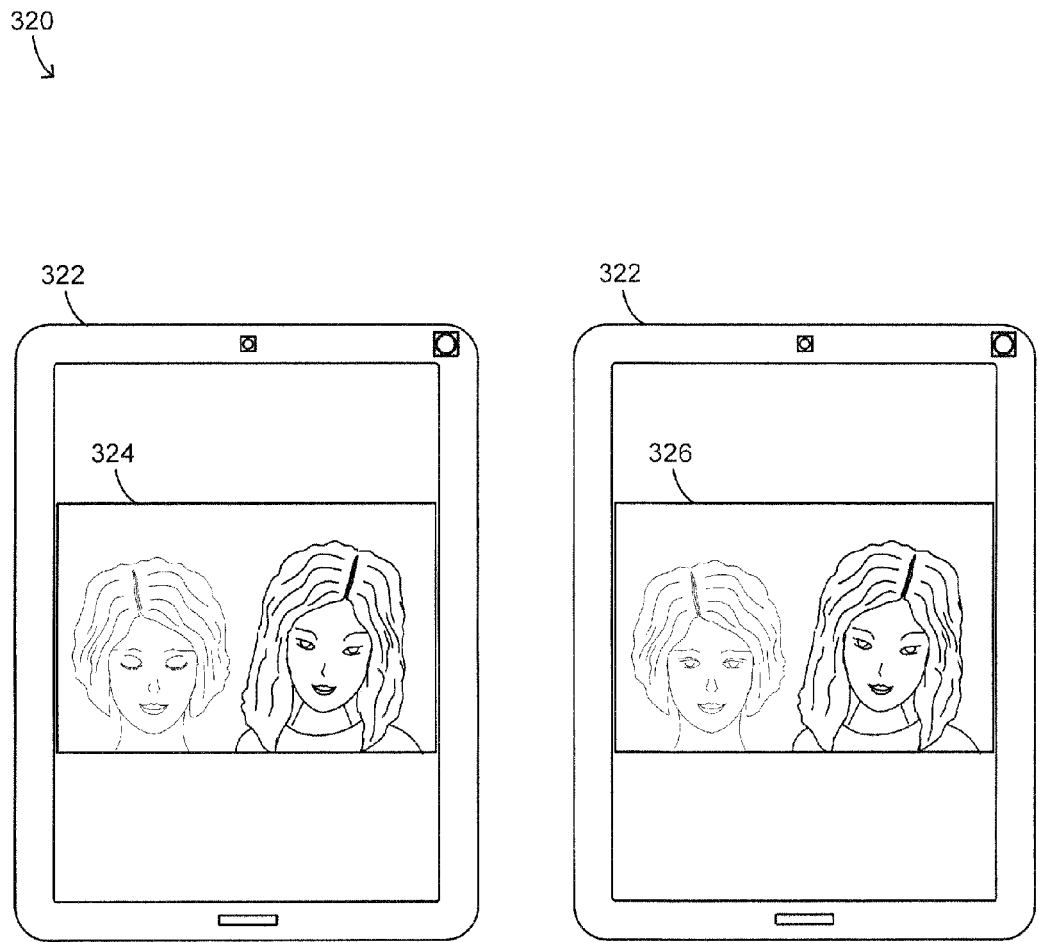
FIG. 3B illustrates an example scenario in which one or more faces displayed in an image can be adjusted.

FIG. 3B illustrates an example scenario 320 in which one or more faces displayed in an image can be adjusted. In the example scenario 320 of FIG. 3B, a computing device 322 can receive or identify an image 324 to be adjusted (i.e., modified). The image 324 to be adjusted includes a user whose eyes are closed. For example, the user might have unintentionally closed her eyes due to the flash of the camera when the image 324 was taken. The image 324 can be analyzed and the face in the image 324 can be identified as sufficiently matching a virtual representation of a "known" face (e.g., the user's face). The virtual representation can provide information about how the user's face would appear when her eyes are open. Accordingly, the image 324 can be modified/adjusted (e.g., improved), thereby resulting in an image 326 with the user's eyes now open.

In one example, the user of the device 322 can be the left subject in the image 324. The device 322 can have already acquired images of the user's face and have generated a virtual representation for the user's face, thereby rendering the user as being a "known," recognized, identified, authorized, or preferred, etc., user of the device 322. The user can tap on or otherwise select the image 324 to be adjusted. The user can tap on or otherwise select her face (with the eyes closed) in the image 324, which can cause the device 322 to analyze her face in the image 324. Continuing with the example, the device 322 can provide a set of options for the user to choose. The user can choose an "Open Eyes" option, for example. The device 322 can then modify the image 324, resulting in the image 326 in which the user's eyes are open.

In another example, the device 322 can automatically select and/or analyze the image 324 and determine that the left subject's eyes are closed. The device 322 can automatically attempt to modify the image 324 with the closed eyes, to result in the image 326 with the open eyes. If successful, the device 322 can present the modified image 326 to the user. The user can then decide to accept, decline, or otherwise handle the modified (e.g., improved) image 326 with the open eyes.

Figure 3C:
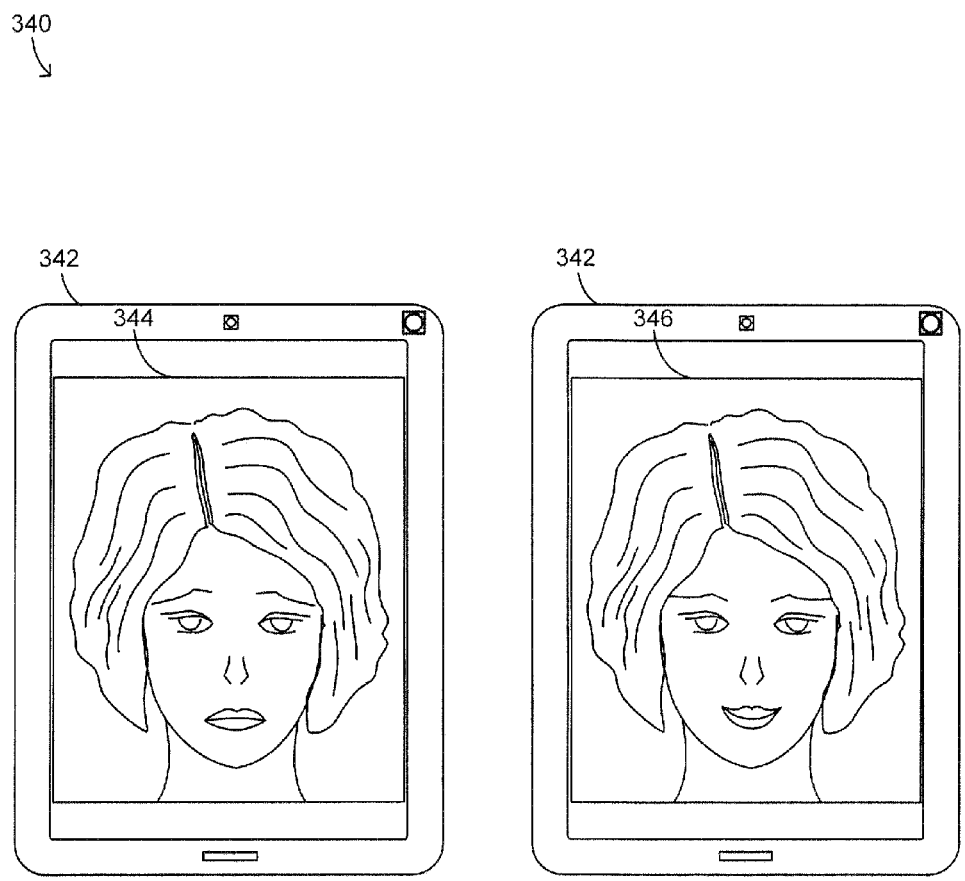
FIG. 3C illustrates an example scenario in which one or more faces displayed in an image can be adjusted.

FIG. 3C illustrates an example scenario 340 in which one or more faces displayed in an image can be adjusted. In the example scenario 340, a computing device 342 can receive or identify image data 344 to be modified. The image data 344 can include a facial representation associated with a subject of a photograph embodied by the image data 344. The facial representation (i.e., face) in the image data 344 (i.e., image) can express a particular facial expression. The device 342 can modify the facial expression of the face in the image data 344 to result in modified image data 346 which includes a modified facial expression. In the example of FIG. 3C, a sad or neutral facial expression of a user can be adjusted or modified into a happy or positive facial expression.

Figure 3D:
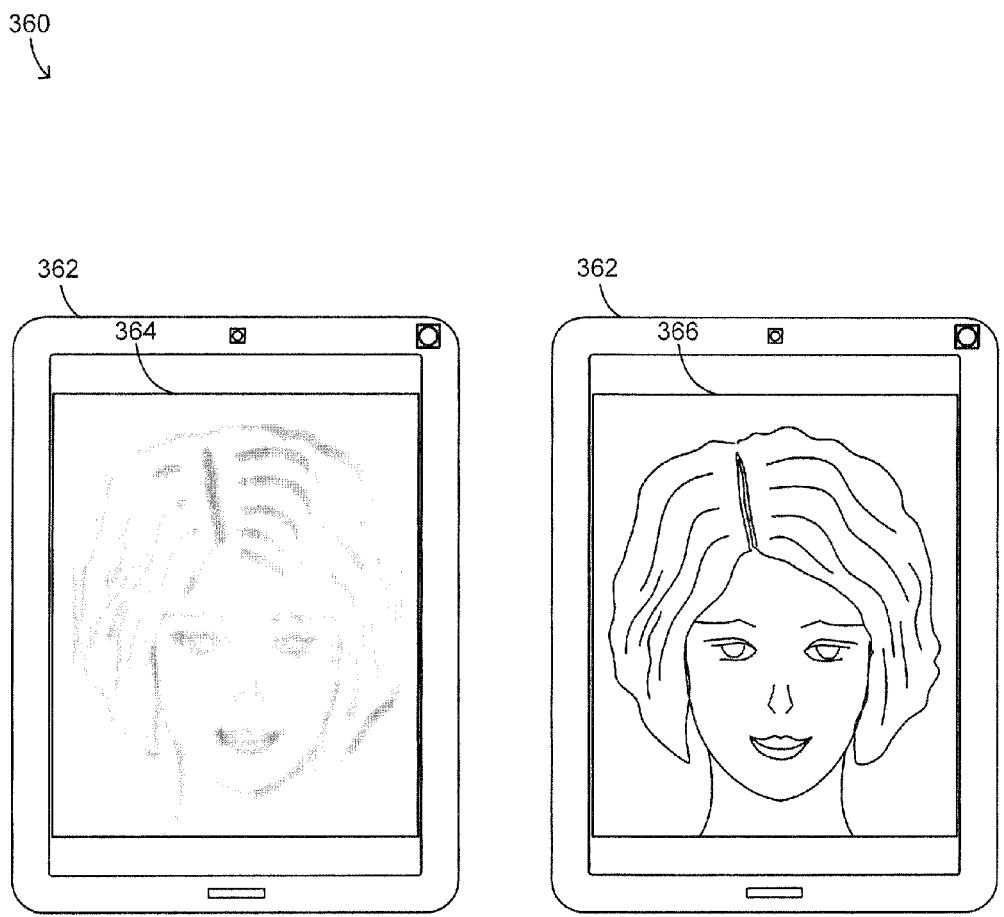
FIG. 3D illustrates an example scenario in which one or more faces displayed in an image can be adjusted.

FIG. 3D illustrates an example scenario 360 in which one or more faces displayed in an image can be adjusted. The example 360 of FIG. 3D illustrates how a computing device 362 can receive, select, or identify an image 364 with a blurry face, and modify the image 364 to result in an image 366 with a reduction or elimination of the blurring effect with respect to the face. In some embodiments, similar to previous discussions (e.g., image downscaling), the device 362 can apply a blurring process to the already acquired image 366 which is non-blurred. In some instances, the blurred version of the already acquired image 366 (as well as the already acquired image 366) can be stored in the image library. The blurred version can be linked to the already acquired (non-blurred) image 366 (i.e., the device and/or image library can have information indicating that the blurred version corresponds to a blurred copy of the already acquired, non-blurred image 366). The device 362 can then incorporate the blurred version of the image 366 into the virtual representation of the face. Then when the blurry image 364 is received or identified, the blurry image 364 can be found to match the blurred version of the image 366. Then the device 362 can modify the blurry image 364 using the non-blurred (e.g., sharp) image 366.

It is further contemplated that there can be many other variations (e.g., removing occlusions that at least partially block faces, modifying viewing angles/perspectives of faces, improving lighting conditions for faces, etc.), implementations, uses, and/or applications associated with the various embodiments of the present disclosure that a person having ordinary skill in the art would recognize.

Figure 4:
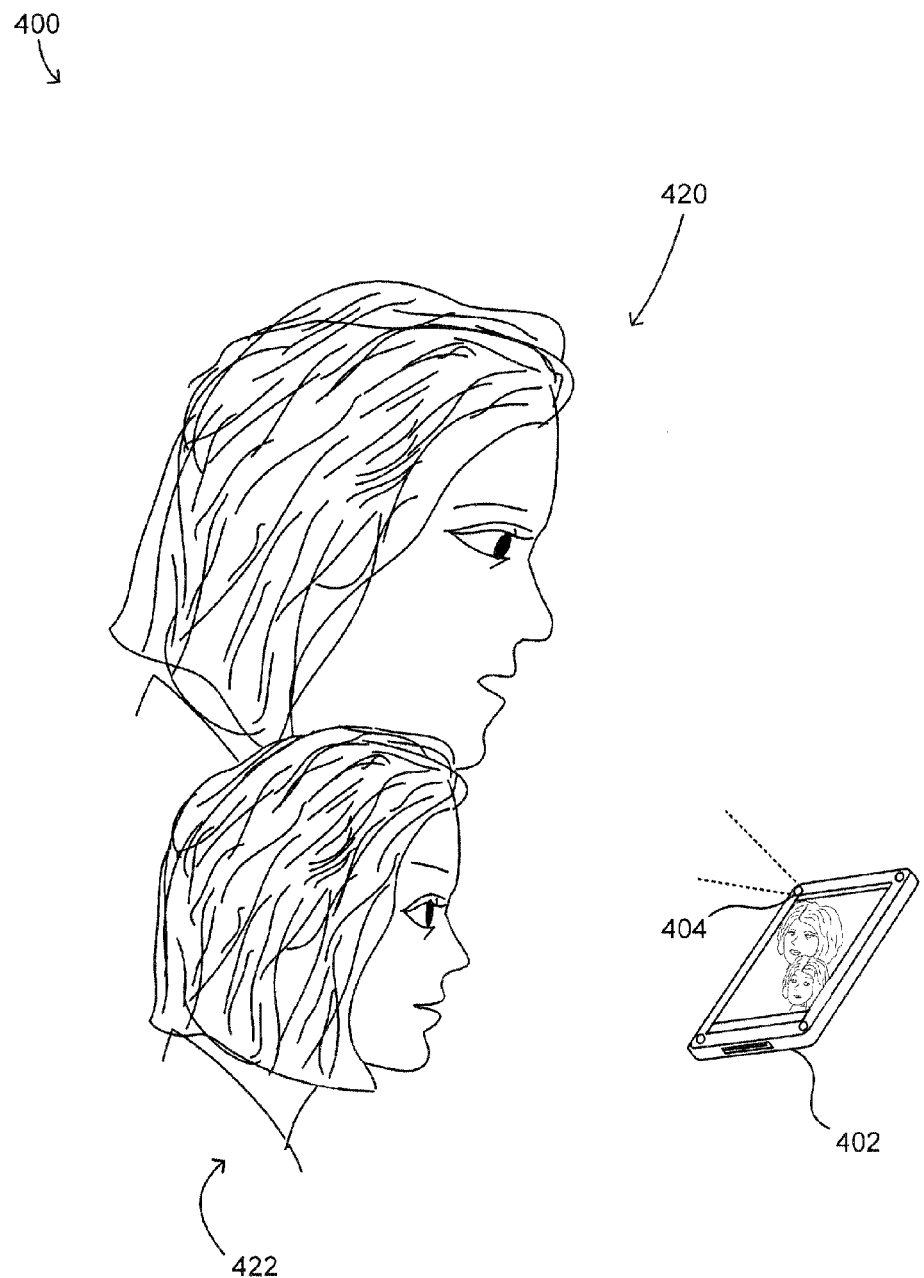
FIG. 4 illustrates an example scenario in which aspects of various embodiments can be utilized.

With reference to FIG. 4, FIG. 4 illustrates an example scenario 400 in which aspects of various embodiments can be utilized. The example scenario 400 can include a computing device 402, a first user 420 of the device 402, and a second user 422 of the device 402. In some embodiments, the device 402 can attempt to identify one of the users as being a preferred user based on the virtual representation of the preferred user's face. In some cases, the preferred user can be an owner of the device 402, a primary user of the device 402, and/or a parent or guardian of a child user of the device 402, etc.

In this example, the first user 420 can be a parent or guardian of the second user 422. The device 402 can have already generated a virtual representation for the face of the first user 420 and can be already configured to recognize the first user 420 as being a preferred user (e.g., preferred relative to the second user 422). When the device 422 recognizes the face of the first user 420 based on the virtual representation, the device 422 can identify the first user 420 as being a preferred user and thus can prioritize commands imitated by the first user 420 over commands given by the second user 422.

In some embodiments, the commands can be detected using one or more sensors of the computing device. For example, a head or hand gesture can be detected using a camera of the device. A voice command can be detected using a microphone of the device. In one example, the device 402 can prioritize head gestures performed by the head of the first user 420 over those by the second user 422. In another example, the device 402 can prioritize facial gestures (e.g., blinking, winking, moving eyebrows, and/or other gestural facial expressions, etc.) performed by the first user 420 over those by the second user 422. In another example, the device 402 can track and recognize a gesture performed by a hand that is closer in proximity to the face of the first user 420, but ignore gestures from a hand that is closer in proximity to the second user's face. In a further example, the device 402 can listen for voice commands when the first user's mouth moves but ignore voice commands when the second user's mouth moves.

Figure 5:
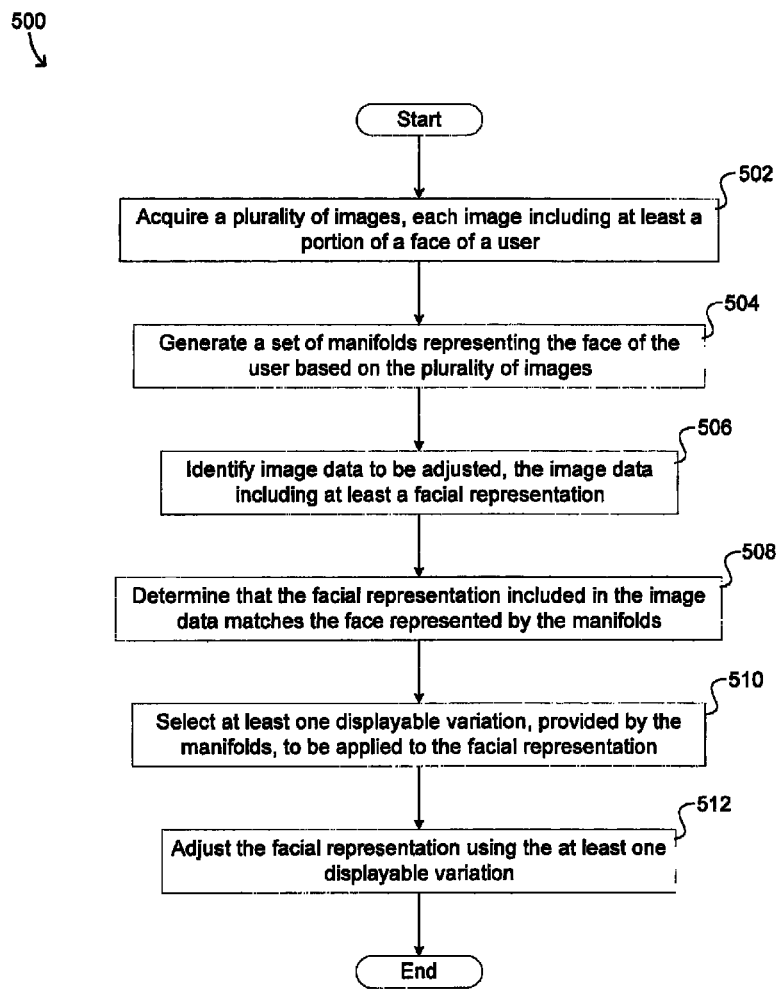
FIG. 5 illustrates an example method embodiment for utilizing data recognition to obtain input.

Referring now to FIG. 5, FIG. 5 illustrates an example method embodiment 500 for utilizing data recognition to obtain input. It should be understood that there can be additional, fewer, or alternative steps performed in similar or alternative orders, or in parallel, within the scope of the various embodiments unless otherwise stated. At step 502, the example method embodiment 500 can acquire a plurality of images, each image including at least a portion of a face of a user. In some embodiments, at least some of the plurality of images are acquired using the at least one camera.

At step 504, the example method 500 can generate a set of manifolds representing the face of the user based, at least in part, on the plurality of images. For example, the plurality of images can represent variations as to how the face appears. The set of manifolds can be learned or developed from the variations of the face as represented in the plurality of images. In some embodiments, the set of manifolds can provide information about one or more displayable variations associated with the face. Step 506 can include identifying image data to be adjusted (e.g., identifying a subsequent image to be adjusted), and the image data can include at least a facial representation. In one example, the user can select or identify the image data to be adjusted. In another example, an automated process (e.g., an automated image processing technique) can determine that the image data includes one or more image qualities that are below a minimum standard or level, and thus determine to adjust or modify the image data.

Then at step 508, the method 500 can determine that the facial representation included in the image data matches, within an allowable deviation, the face represented by the set of manifolds. In some cases, matching can be performed using, at least in part, image processing techniques, such as edge detection, line detection, pixel comparison, and/or facial feature recognition, etc. Step 510 can include selecting at least one displayable variation, provided by at least a portion of the set of manifolds, to be applied to the facial representation included in the image data. Then the method 500 can adjust the facial representation using the at least one displayable variation, at step 512.

Figure 6:
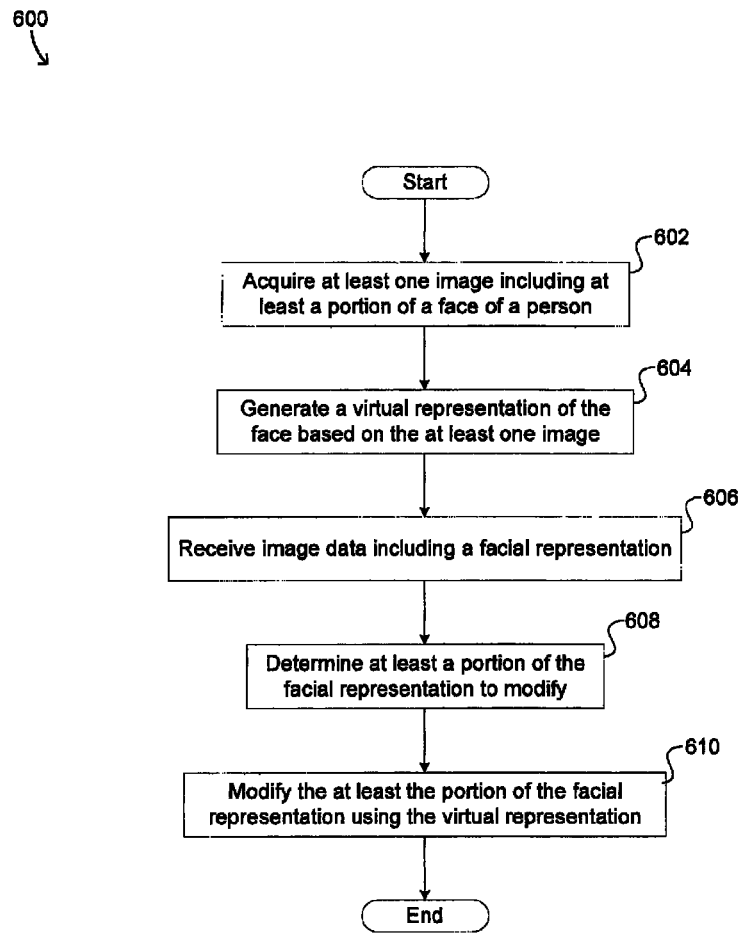
FIG. 6 illustrates an example method embodiment for utilizing data recognition to obtain input.

FIG. 6 illustrates an example method embodiment 600 for utilizing data recognition to obtain input. Again, it should be understood that there can be additional, fewer, or alternative steps performed in similar or alternative orders, or in parallel, within the scope of the various embodiments unless otherwise stated. The example method embodiment 600 can acquire at least one image, at step 602. The at least one image can include at least a portion of a face of a user.

In some embodiments, the at least one image can be acquired via at least one of a camera of a computing device, a storage device of the computing device, a social network service (e.g., social media service), or a database residing at a network (e.g., online content/file management system).

At step 604, the example method 600 can generate a virtual representation of the face of the user based, at least in part, on the at least one image. In some instances, the virtual representation can provide information about one or more details associated with the face.

Step 606 can include receiving image data (e.g., receiving a subsequent image) including a facial representation. The image data including the facial representation can be the subject to be adjusted or modified. In one example, if the image data including the facial representation is determined to have one or more image qualities that are below a minimum standard or level (e.g., at least partially blocked, at least partially blurred, one or more closed eyes, etc.), then the method 600 can decide to adjust or modify the image data including the facial representation. In another example, the user can specify, select, or identify the image data including the facial representation to be adjusted or modified. In some embodiments, the image data to be adjusted/modified can be received from at least one of a camera of a computing device, a storage device of the computing device, a social network service, or a database residing at a network.

The method 600 can then determine at least a portion of the facial representation to modify, at step 608. Then step 610 can include modifying the at least the portion of the facial representation using at least one detail associated with the face provided by the virtual representation of the face.

Moreover, various embodiments of the present disclosure can also be implemented for real-time features. In one example, the acquired at least one image can correspond to a video image frame acquired in real-time via one or more cameras of the computing device. The received image data (e.g., subsequent image) including the facial representation can correspond to a still image. Further, the modification of the at least the portion of the facial representation included in the image data can occur in real-time. In some cases, the still image (i.e., the received image data including the facial representation) can be acquired previously. In other words, the still image could have been taken/captured at a previous time. The modification of the facial representation included in the previously acquired still image can nonetheless occur in real-time (e.g., based on the video image frame acquired in real-time).

Additionally, in some embodiments, the virtual representation of the face of the user can be utilized in an authentication process. For example, subsequent to generating the virtual representation of the user's face, the virtual representation can be stored with the computing device. If the computing device gets locked (e.g., screen-locked, etc.), the user can initiated an unlock process. The unlock process can involve acquiring image data representative of the user's face, attempt to match the user's face represented in the image data with the stored virtual representation of the user's face, and unlocking the device when the match is successful.

It is further contemplated that there can be many other implementation variations, uses, and/or applications associated with the various embodiments of the present disclosure that a person having ordinary skill in the art would recognize.

Figure 7:
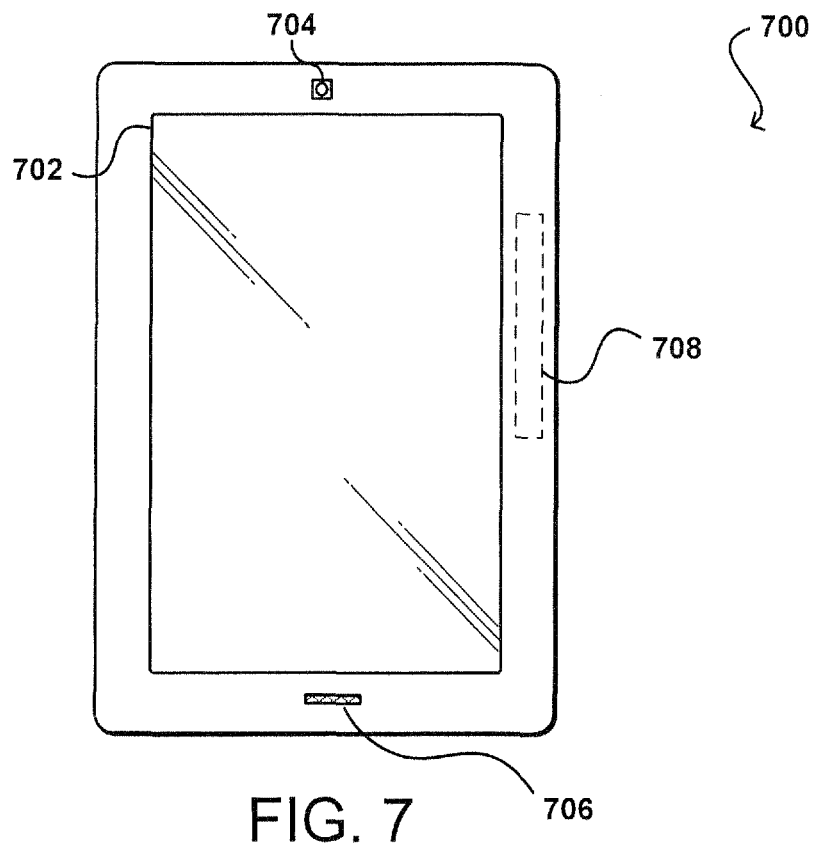
FIG. 7 illustrates an example device that can be used to implement aspects of the various embodiments.

FIG. 7 illustrates an example electronic user device 700 that can be used in accordance with various embodiments. Although a portable computing device (e.g., an electronic book reader or tablet computer) is shown, it should be understood that any electronic device capable of receiving, determining, and/or processing input can be used in accordance with various embodiments discussed herein, where the devices can include, for example, desktop computers, notebook computers, personal data assistants, smart phones, gaming consoles, television set top boxes, smart televisions, wearable computers (e.g., a watch or glasses), and portable media players. In some embodiments, a computing device can be an analog device, such as a device that can perform signal processing using operational amplifiers. In this example, the computing device 700 has a display screen 702 on the front side, which under normal operation will display information to a user facing the display screen (e.g., on the same side of the computing device as the display screen). The computing device in this example includes at least one camera 704 or other imaging element for capturing still or video image information over at least a field of view of the at least one camera. In some embodiments, the computing device might only contain one imaging element, and in other embodiments the computing device might contain several imaging elements. Each image capture element may be, for example, a camera, a charge-coupled device (CCD), a motion detection sensor, or an infrared sensor, among many other possibilities. If there are multiple image capture elements on the computing device, the image capture elements may be of different types. In some embodiments, at least one imaging element can include at least one wide-angle optical element, such as a fish eye lens, that enables the camera to capture images over a wide range of angles, such as 180 degrees or more. Further, each image capture element can comprise a digital still camera, configured to capture subsequent frames in rapid succession, or a video camera able to capture streaming video.

The example computing device 700 also includes at least one microphone 706 or other audio capture device capable of capturing audio data, such as words or commands spoken by a user of the device. In this example, a microphone 706 is placed on the same side of the device as the display screen 702, such that the microphone will typically be better able to capture words spoken by a user of the device. In at least some embodiments, a microphone can be a directional microphone that captures sound information from substantially directly in front of the microphone, and picks up only a limited amount of sound from other directions. It should be understood that a microphone might be located on any appropriate surface of any region, face, or edge of the device in different embodiments, and that multiple microphones can be used for audio recording and filtering purposes, etc.

The example computing device 700 also includes at least one orientation sensor 708, such as a position and/or movement-determining element. Such a sensor can include, for example, an accelerometer or gyroscope operable to detect an orientation and/or change in orientation of the computing device, as well as small movements of the device. An orientation sensor also can include an electronic or digital compass, which can indicate a direction (e.g., north or south) in which the device is determined to be pointing (e.g., with respect to a primary axis or other such aspect). An orientation sensor also can include or comprise a global positioning system (GPS) or similar positioning element operable to determine relative coordinates for a position of the computing device, as well as information about relatively large movements of the device. Various embodiments can include one or more such elements in any appropriate combination. As should be understood, the algorithms or mechanisms used for determining relative position, orientation, and/or movement can depend at least in part upon the selection of elements available to the device.

Figure 8:
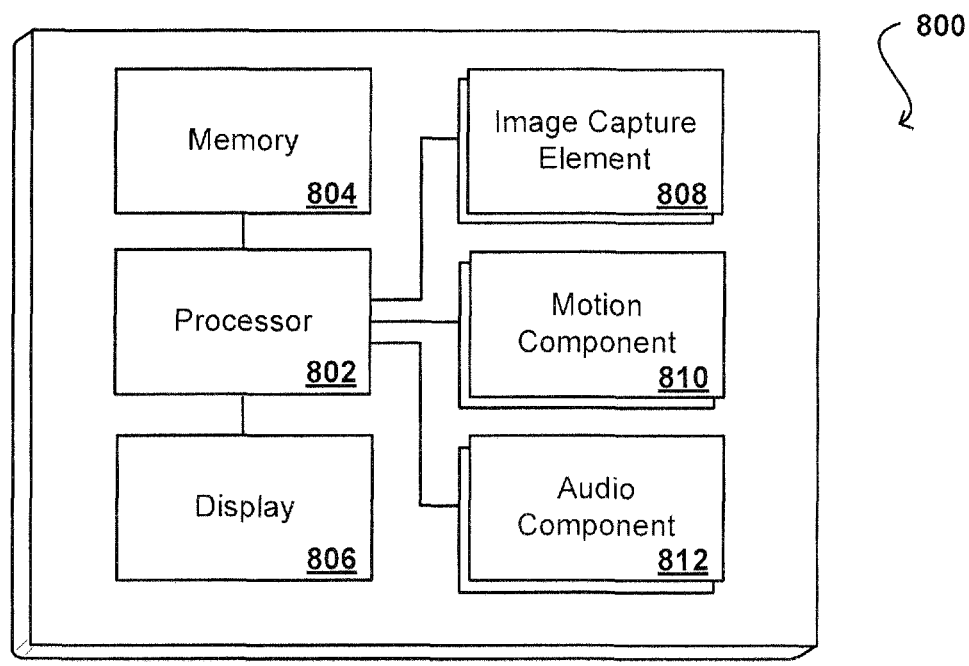
FIG. 8 illustrates example components of a client device such as that illustrated in FIG. 7.

FIG. 8 illustrates a logical arrangement of a set of general components of an example computing device 800 such as the device 700 described with respect to FIG. 7. In this example, the device includes a processor 802 for executing instructions that can be stored in a memory device or element 804. As would be apparent to one of ordinary skill in the art, the device can include many types of memory, data storage, or non-transitory computer-readable storage media, such as a first data storage for program instructions for execution by the processor 802, a separate storage for images or data, a removable memory for sharing information with other devices, etc. The device typically will include some type of display element 806, such as a touch screen or liquid crystal display (LCD), although devices such as portable media players might convey information via other means, such as through audio speakers. As discussed, the device in many embodiments will include at least one image capture element 808 such as a camera or infrared sensor that is able to image projected images or other objects in the vicinity of the device. Methods for capturing images or video using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device. The example device similarly includes at least one audio capture component 812, such as a mono or stereo microphone or microphone array, operable to capture audio information from at least one primary direction. A microphone can be a uni- or omni-directional microphone as known for such devices.

In some embodiments, the computing device 800 of FIG. 8 can include one or more communication elements (not shown), such as a Wi-Fi, Bluetooth, RF, wired, or wireless communication system. The device in many embodiments can communicate with a network, such as the Internet, and may be able to communicate with other such devices. In some embodiments the device can include at least one additional input device able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

The device 800 also can include at least one orientation or motion sensor 810. As discussed, such a sensor can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as may enable location determinations through triangulation or another such approach. These mechanisms can communicate with the processor 802, whereby the device can perform any of a number of actions described or suggested herein.

As an example, a computing device such as that described with respect to FIG. 7 can capture and/or track various information for a user over time. This information can include any appropriate information, such as location, actions (e.g., sending a message or creating a document), user behavior (e.g., how often a user performs a task, the amount of time a user spends on a task, the ways in which a user navigates through an interface, etc.), user preferences (e.g., how a user likes to receive information), open applications, submitted requests, received calls, and the like. As discussed above, the information can be stored in such a way that the information is linked or otherwise associated whereby a user can access the information using any appropriate dimension or group of dimensions.

Figure 9:
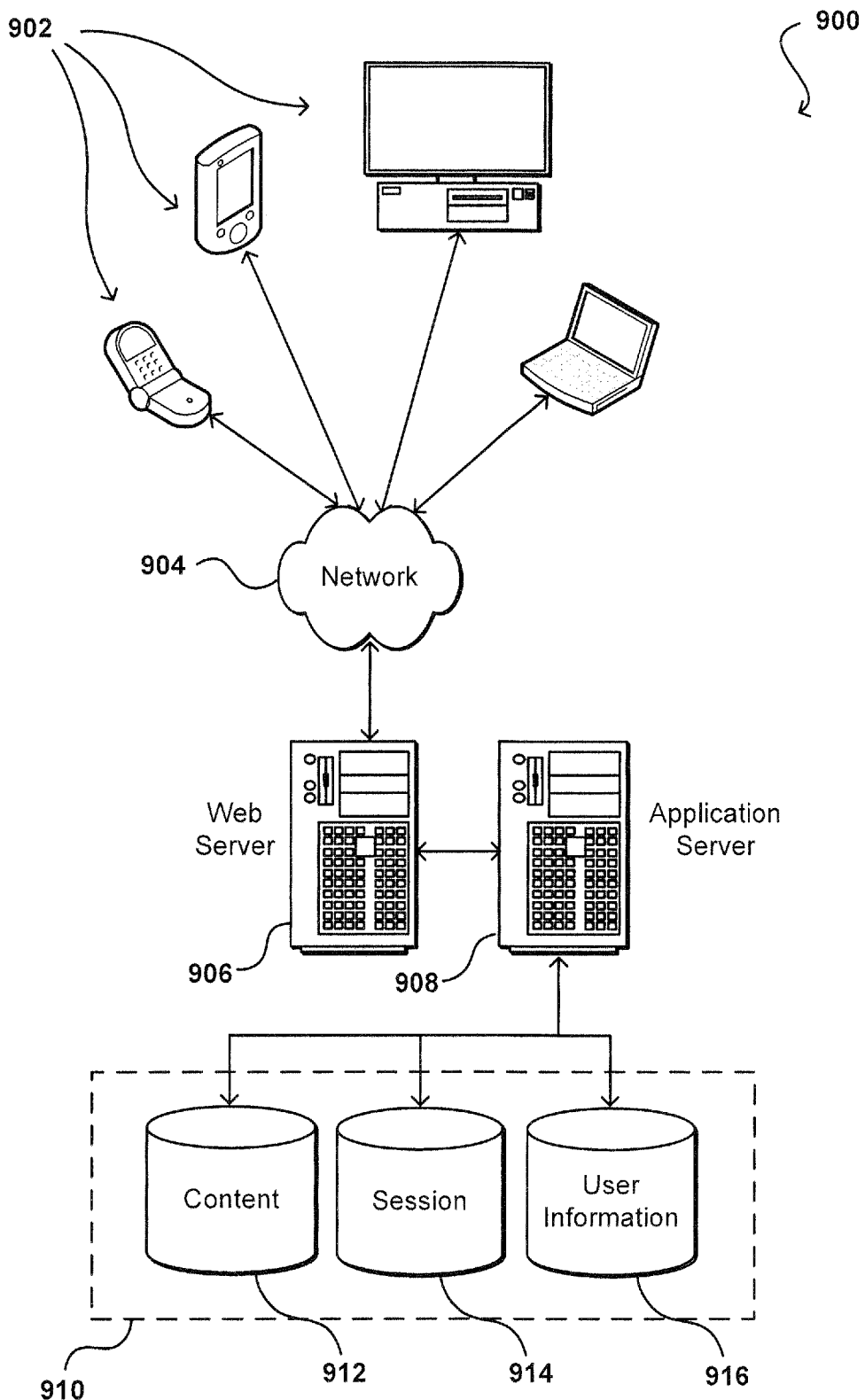
FIG. 9 illustrates an environment in which various embodiments can be implemented.

As discussed, different approaches can be implemented in various environments in accordance with the described embodiments. For example, FIG. 9 illustrates an example of an environment 900 for implementing aspects in accordance with various embodiments. As will be appreciated, although a Web-based environment is used for purposes of explanation, different environments may be used, as appropriate, to implement various embodiments. The system includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 906 for receiving requests and serving content in response thereto, although for other networks an alternative device serving a similar purpose could be used, as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 902 and the application server 908, can be handled by the Web server 906. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of element. In this case, the data store might access the user information to verify the identity of the user and can access the catalog detail information to obtain information about elements of that type. The information can then be returned to the user, such as in a results listing on a Web page that the user is able to view via a browser on the user device 902. Information for a particular element of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing device for adjusting faces in images, the computing device comprising:
   a camera;
   at least one processor; and
   a memory including instructions that, when executed by the at least one processor, cause the computing device to:
   acquire a plurality of high resolution images, each high resolution image of the plurality of high resolution images including at least a portion of a first representation of a face, wherein at least some of the plurality of high resolution images are acquired using the camera;
   generate a set of manifolds representing the first representation of the face based, at least in part, on variations of the portion of the first representation of the face included in the plurality of images, the set of manifolds provide information about one or more displayable variations associated with the face and include at least a low-dimensional manifold that represents a downscaled version of the first representation of the face;
   acquire a subsequent image that includes a second representation of the face;
   determine that at least portions of the second representation of the face included in the subsequent image match, within an allowable deviation, the downscaled version of the first representation of the face;
   select at least one displayable variation from the one or more displayable variations associated with the face to be applied to the second representation of the face; and
   generate an adjusted second representation based at least in part on the second representation of the face included in the subsequent image and based at least in part by applying the at least one displayable variation to the subsequent image.

2. The computing device of claim 1, wherein the instructions further cause the computing device to:
   generate a model of the face based, at least in part, on the set of manifolds, wherein the information about the one or more displayable variations associated with the face is provided via the model of the face.

3. The computing device of claim 1, wherein the instructions further cause the computing device to:
   identify at least a portion of the second representation of the face in the subsequent image to be adjusted based on at least one of a user-initiated command or an image processing technique.

4. The computing device of claim 1, wherein the one or more displayable variations associated with the face includes at least one of a view of at least a portion of the face, a lighting effect on the at least the portion of the face, a facial expression caused by the at least the portion of the face, or an image quality associated with the at least the portion of the face.

5. The computing device of claim 1, wherein selecting the at least one displayable variation is performed based on at least one of a user-initiated command or an automated process.

6. A computer-implemented method comprising:
   acquiring at least one high resolution image including at least a portion of a face;
   generating a first representation of the face based, at least in part, on the at least one high resolution image, the first representation provides information about one or more details associated with the face and includes at least a low-dimensional manifold that represents a downscaled version of the first representation of the face;
   receiving a subsequent image that includes a second representation of the face;
   determining the second representation of the face matches, within an allowable deviation, the downscaled version of the first representation of the face;
   determining a portion of the second representation of the face in the subsequent image to modify; and
   generating an adjusted second representation of the face for the subsequent image using information provided by the first representation of the face.

7. The computer-implemented method of claim 6, wherein determining the second representation of the face matches, within the allowable deviation, the downscaled version of the first representation of the face further comprises:
   comparing the second representation of the face in the subsequent image to the low-dimensional manifold; and
   determining that the second representation of the face in the subsequent image matches the low-dimensional manifold within an allowable deviation.

8. The computer-implemented method of claim 6, further comprising:
   identifying the second representation of the face in the subsequent image as a preferred representation of the face.

9. The computer-implemented method of claim 8, further comprising:
   identifying, using one or more sensors of the computing device, a plurality of commands detectable by the computing device;
   determining that at least one command in the plurality of commands is associated with the preferred representation of the face; and
   prioritizing the at least one command associated with the preferred representation of the face over other commands in the plurality of commands.

10. The computer-implemented method of claim 9, wherein the at least one command corresponds to at least one of a voice command or a gesture command.

11. The computer-implemented method of claim 6, wherein generating the first representation of the face further comprises:
    developing a set of manifolds representative of the first representation of the face, wherein one or more subspaces associated with the set of manifolds correspond to the one or more details associated with the first representation of the face.

12. The computer-implemented method of claim 6, wherein the at least one high resolution image and the subsequent image originate from at least one of a camera of a computing device, a storage device of the computing device, a social network service, or a database residing at a network.

13. The computer-implemented method of claim 6, wherein the at least one high resolution image is acquired via at least one front-facing camera of the computing device, and wherein acquiring the at least one high resolution image is performed during at least one of a configuration process or a recurring time interval.

14. The computer-implemented method of claim 6, wherein the at least one high resolution image corresponds to a video image frame acquired in real-time via one or more cameras of the computing device, wherein the subsequent image corresponds to a still image, and wherein generating the adjusted second representation of the face in the subsequent image occurs in real-time.

15. The computer-implemented method of claim 6, further comprising:
   receiving metadata related to the at least one high resolution image; and
   improving at least a portion of the first representation of the face using the metadata.

16. The computer-implemented method of claim 6, wherein the one or more details associated with the first representation of the face includes at least one of a view of at least a portion of the first representation of the face, a lighting effect on the at least the portion of the first representation of the face, a facial expression caused by the at least the portion of the first representation of the face, or an image quality associated with the at least the portion of the first representation of the face.

17. The computer-implemented method of claim 6, further comprising:
   determining at least a portion of the second representation of the face included in the subsequent image includes a blur; and
   wherein generating the adjusted second representation of the face for the subsequent image further comprises reducing the blur.

18. A non-transitory computer-readable storage medium including instructions that, when executed by at least one processor of a computing system, cause the computing system to:
   acquire at least one high resolution image including at least a portion of a face;
   generate a first representation of the face based, at least in part, on the at least one high resolution image, the first representation provides information about one or more details associated with the face and includes at least a low-dimensional manifold that represents a downscaled version of the high resolution image;
   receive a subsequent image that includes a second representation of the face;
   determine the second representation of the face matches, within an allowable deviation, the downscaled version of the high resolution image;
   determine a portion of the second representation of the face in the subsequent image to modify; and
   generate an adjusted second representation of the face for the subsequent image using information provided by the first representation of the face.

19. The non-transitory computer-readable storage medium of claim 18, wherein the instructions that cause the computing system to determine the second representation of the face matches, within the allowable deviation, the downscaled version of the high resolution image further comprise:
   comparing the second representation of the face in the subsequent image to the low-dimensional manifold; and
   determining that the second representation of the face in the subsequent image matches the low-dimensional manifold within an allowable deviation.

20. The non-transitory computer-readable storage medium of claim 18, wherein the instructions that cause the computing system to generate the first representation of the face further comprise:
   develop a set of manifolds representative of the face, wherein one or more subspaces associated with the set of manifolds correspond to the one or more details associated with the first representation of the face.

* * * * *